United States Patent [19]
Smith et al.

[11] Patent Number: 5,407,702
[45] Date of Patent: Apr. 18, 1995

[54] METHOD FOR COATING A METAL STRIP

[75] Inventors: David A. Smith, Murrysville; Susan A. Stanton, Evans City; Gary J. DiFranco, Pittsburgh; Roy B. Steidley, Oakmont; John M. Stinson, Murrysville; Thomas L. Levendusky, Greensburg; Vincent J. Downard, Arnold; William F. Forster, Leechburg; John R. McAllister, New Kensington, all of Pa.

[73] Assignee: Aluminum Company of America, Pittsburgh, Pa.

[21] Appl. No.: 57,743

[22] Filed: May 5, 1993

[51] Int. Cl.6 ............................................. B05D 1/00
[52] U.S. Cl. ................................. 427/211; 156/229; 156/322; 156/324; 427/172; 427/178; 427/209; 427/223; 427/318; 427/327; 427/374.1; 427/388.1; 427/398.3; 427/428
[58] Field of Search ............ 427/209, 318, 327, 374.4, 427/388.1, 398.2, 172, 178, 211, 223, 374.1, 398.3, 428; 156/229, 322, 324

[56] References Cited

U.S. PATENT DOCUMENTS

| | | | |
|---|---|---|---|
| 3,206,848 | 9/1965 | Rentmeester | 29/528 |
| 3,832,962 | 9/1974 | Rolles | 113/120 A |
| 3,962,060 | 6/1976 | Brasko et al. | 204/181 |
| 4,486,497 | 12/1984 | Mizutani | 428/332 |
| 4,517,255 | 5/1985 | Kanda et al. | 428/626 |
| 4,614,691 | 9/1986 | Inui et al. | 428/623 |
| 4,788,088 | 11/1988 | Kohl | 428/34.5 |
| 4,957,820 | 9/1990 | Heyes et al. | 428/623 |
| 5,059,460 | 10/1991 | Heyes et al. | 428/35.3 |
| 5,093,208 | 3/1992 | Heyes et al. | 428/623 |
| 5,149,389 | 9/1992 | Heyes et al. | 156/272.4 |

FOREIGN PATENT DOCUMENTS

| | | |
|---|---|---|
| 0067060 | 12/1982 | European Pat. Off. . |
| 353933 | 3/1991 | Japan . |
| 2211140 | 6/1989 | United Kingdom . |
| 2233277 | 8/1991 | United Kingdom . |

OTHER PUBLICATIONS

Thakrar, Anil and Arthur C. Hettinger, "Development of a Dual Extrusion Die", Soc Plast Eng, Tech Pap, vol. 21, pp. 366–369 (1975) (no mouth avail.).

Primary Examiner—Bernard Pianalto
Attorney, Agent, or Firm—David W. Brownlee

[57] ABSTRACT

A method for extrusion coating both sides of a metal strip. A metal strip, such as aluminum alloy strip, is moved through a pre-conditioner, two extrusion dies, a post heater and a cooling system. Both sides of the strip are coated with thin coatings of polyester material. The coated metal strip is useful for containers, such as cans and can ends, as well as for automobiles, appliances, aerospace, construction and electrical devices.

38 Claims, 4 Drawing Sheets

METHOD FOR COATING A METAL STRIP

This invention relates to a method and apparatus for applying a polymer coating on a strip of metal and, in particular, to a method of coating both sides of an aluminum strip with thermoplastic resins from extruders or extrusion dies which are positioned on opposite sides of the strip. The product of this invention is a strip of metal, such as aluminum, which has thin polymer coatings on both sides thereof and which is particularly well suited for use in packaging applications such as can ends and can bodies.

BACKGROUND OF THE INVENTION

It is known to coat metal sheet or strip with thermoplastic resin on one or both sides to improve the corrosion resistance, formability, appearance or other properties of the material. The coating can be applied by a variety of processes such as roll coating, reverse roll coating, spraying, electrocoating, powder coating, and lamination. The coated strip may be used for applications such as in cans and can ends, foil pouches, lidding stock, appliances, electrical devices, construction, aerospace or automotive body sheet.

U.S. Pat. No. 5,093,208 to Heyes et al. discloses a method for forming a laminated metal sheet in which a precast thermoplastic polyester film is pressed against one or both surfaces of a metal sheet to adhere the film to the sheet in a non-crystalline form. The uncoated sheet of metal is heated to a temperature above the melting point of the polyester film and the film is applied to the sheet under pressure to form a laminate material. The laminate material is then heated to above the melting point of the film to improve the bond of the plastic film to the metal and is quenched rapidly to a temperature below the glass transition point of the polyester to form a non-crystalline polyester. The quenching is done by passing the laminate through a curtain of water.

European Patent Application 0067060 in the name of Taiyo Steel Ltd. discloses a method of producing a coated metal plate by directly extruding a thermoplastic resin onto the heated surface of the plate. According to that patent application, molten resin is applied directly from the extrusion die to the metal plate without forming the resin into an independent film. The thickness of the film can be less than 50 microns and preferably down to 35 to 5 microns. The patent states that since the step of forming an independent film is omitted, the cost of producing the coated metal is reduced. Suitable thermoplastic resins used for coating of metal surfaces include polyolefins, acrylic resins, polyesters, polyamides, polyvinylchlorides and many other resins as listed in the published patent application. The resin can be coated either as a mono-layer or multilayers of the same or different resins. The patent application discloses applying the resin on only one side of the metal strip.

An improved process is desired for applying a thin polymer coating on both sides of a metal strip suitable for use in applications such as packaging. A process is desired for producing tight adhesion or welding of the polymer to the strip so that the polymer will not delaminate during subsequent forming of the strip or use of the products produced from the strip.

SUMMARY OF THE INVENTION

This invention provides a method for coating both sides of a metal strip with thin thermoplastic polymer resin to form a coated strip suitable for use in packaging and other applications.

Accordingly, an object of this invention is to provide a method of adhering polyester resin on both sides of a metal strip to produce an improved strip at reduced cost.

The above and other objects and advantages of this invention will be more fully understood and appreciated with reference to the following description and the drawings attached hereto.

DESCRIPTION OF THE INVENTION

Figure 1:
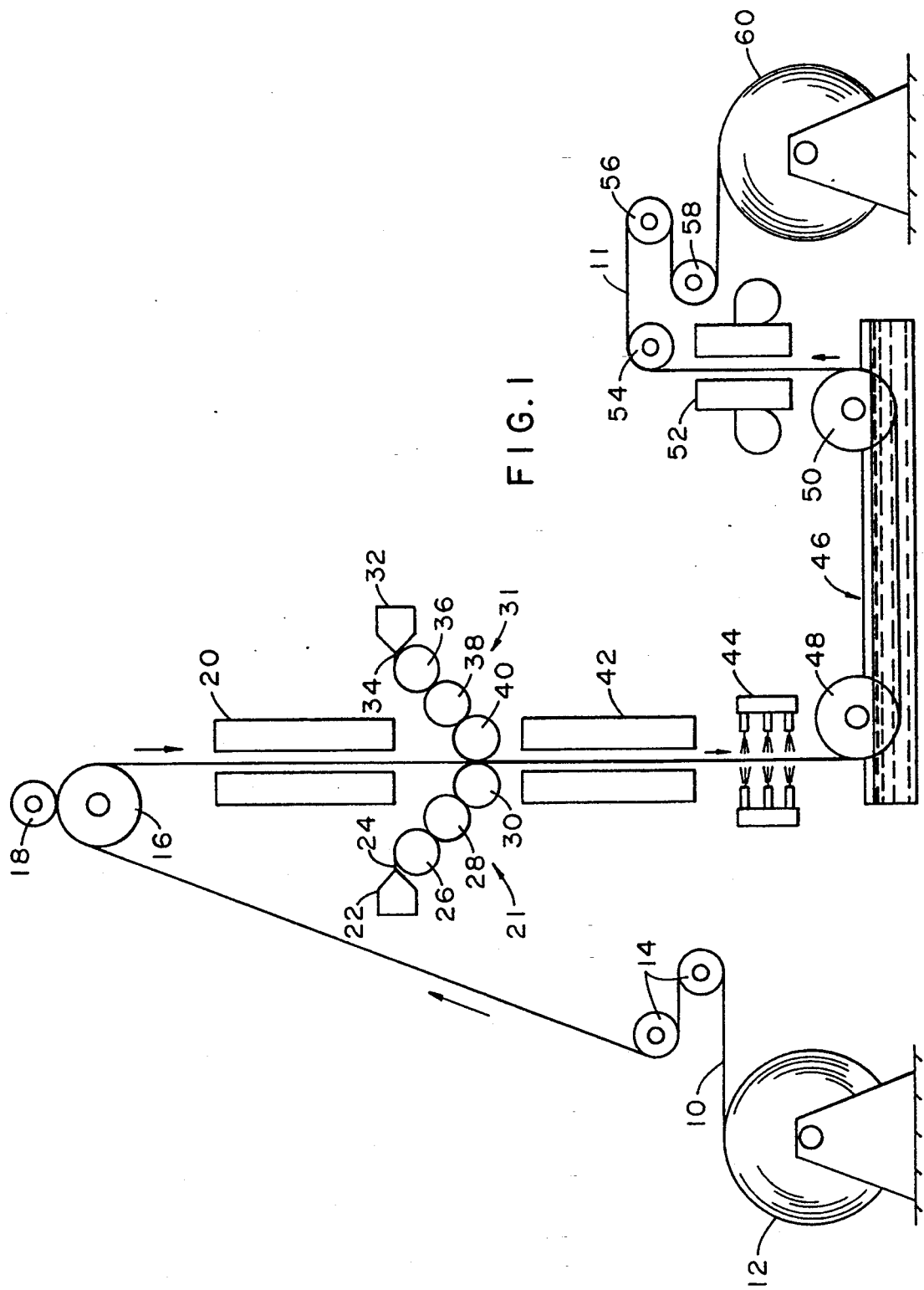
FIG. 1 is a schematic, side elevational view of one embodiment of a system of this invention.

The drawings appended hereto illustrate systems for coating both sides of a strip of metal as it travels from an rewind coil to a second coil on which the metal is wound after it has been coated. Referring in particular to FIG. 1, a strip 10 of aluminum alloy is unwound from coil 12, moves around tension rollers 14, travels vertically upward over a roll 16 and then downward from roll 16 through the coating apparatus. A back-up roll 18 may be used to maintain the metal strip 10 in a flat condition as it moves over support roll 16.

As the strip 10 moves downwardly from roll 16, it is first heated by heater 20 to a temperature close to the melting point of the polyester to be applied thereto. In the embodiment illustrated in FIG. 1, the heater is an induction heater, but other heaters or preconditions such as flame treatment, infrared, plasma and/or corona discharge may also be employed either singularly or in combination. Flame heaters can be used in tandem (one on each side) or on one side only to enhance performance (improved bonding as well as heating). The coil 12 may also be used, which is still hot from the prior processing, such as rolling or heat treatment, to minimize or even eliminate the need for heating by heater 20. A typical temperature to which the metal is heated is in the range of about 121°–260° C. (250°–500° F.) depending on the particular polymer that is to be applied to the strip.

Two separate extrusion systems 21 and 31 are provided for applying thin webs of polyester resin to the two surfaces of the heated web. The systems 21, 31 are disposed just below the induction heater 20. The extrusion systems 21, 31 each include an extruder 22, 32 for delivering a molten polyester extrudate through a sheet die having a narrow exit slit to produce a thin web of extrudate 24, 34 which is passed through a three roll stack. Alternatively, one extruder may feed both extrusion dies via transfer pipes or other manifolding.

The first rolls 26, 36 of the systems 21, 31 are pinning and drawing rolls which are maintained at a temperature which will promote sticking or clinging of the polyester extrudate to the polished surface of the roll. A typical temperature for this purpose is in the range of about 120° to 180° C. (248°-356° F.), depending on the resin being used. The surface speed of the rolls 26, 36 is substantially faster than the speed of the extrudate coming out of the die 22, 32, thus drawing the polyester to a reduced thickness. Typical speed ratios of drawing velocity to extrudate velocities range from about 5:1 to 40:1. The resin from the extruder is typically approximately 0.127–0.635 mm (0.005–0.025 inches) thick and is drawn to a reduced thickness of approximately 0.0076–0.038 mm (0.0003–0.0015 inches) thick.

The second rolls 28, 38 are cooler than the first rolls and are designed to polish and cool the extrudate by rolling contact between the rolls and the extrudate. The second rolls 28, 38 also transfer the extrudate to the third rolls which are the applicator rolls. The third rolls 30, 40 may be tension loaded using springs, pneumatics, or the like and preferably have resilient (such as high temperature resistant elastomers) surfaces to press the semi-cooled extrudates against the heated metal web or strip 10. The third rolls 30, 40 of the two extrusion sets are preferably diametrically opposed and support opposite sides of the strip 10 against the pressure or force of each other so that the semi-cooled extrudates 24, 34 can be pressed against the strip under the pressure of such third rolls 30, 40.

The coated strip of metal 11 continues its vertical downward travel past or through a second heater 42 which uniformly heats the metal to a temperature that will consummate bonding of the polyester to the metal strip without substantially reducing or otherwise deleteriously affecting the desired properties of the metal strip or the plastic coating thereon. The desired temperature will depend on the particular polyester material which is being applied as a coating but is somewhere in the range of approximately 200° to 260° C. (392–500° F.). The second heater 42 is preferably an induction type heater, which is well known in the art. Alternatively, the heater 42 could be a convection oven or an infrared heater.

Upon exit from the second heater 42, and while continuing in a vertical downwardly direction, the coated strip 11 is rapidly cooled as by a water spray 44, a water curtain, or other suitable cooling means. Such cooling must lower the temperature of the composite structure to a low enough temperature to allow turning the coated strip around rollers without deleteriously affecting the coating or the metal. In a preferred method of coating an aluminum alloy can sheet with polyester resin, the composite structure is preferably cooled to below approximately 40° C. (104° F.) before it contacts roller 48. In such a preferred embodiment, cooling is fast enough that the polyester coating on it is solidified in a substantially non-crystalline form. The speed of cooling to accomplish this will depend on the polyester. The rate of cooling can be controlled by controlling the temperature and volume rate of flow of the cooling water against the coated strip.

In the embodiment illustrated in FIG. 1, the coated strip moves through a water bath 46 and around rollers 48 and 50 on opposite ends of the bath before the coating is dried. The water bath completes the cooling process.

From the water bath 46, the coated strip 11 preferably moves vertically upwardly through a drying system 52 to remove residual moisture from the strip before rewinding. The drying system 52 may typically comprise warm air blowers. The composite strip next moves over rollers 54, 56 and 58 and onto a rewinder 60. The system may include accumulators, not shown, to accommodate roll changes and may also include means for leveling the material. The system also preferably includes trimmers, not shown, for trimming the edges of the coated metal web 11 to remove any polymer that extends past the edges of the metal. The trimmers may be located at various points along the path of the strip such as immediately after the polyester resin is applied to the strip, after the spray cooler, or after the drying system.

The aluminum strip that is coated by this invention may be of a variety of alloys and tempers depending on the use which is to be made of the strip. Some typical aluminum alloys suitable to be forming can ends and can bodies include Aluminum Association alloys 5182 and 3004 in the H-19 or H-39 tempers. The metal strip is typically 0.1778–0.356 mm (0.007 to 0.014 inches) thick.

In accordance with this invention, a variety of thermoplastic polyester resins can be used to coat an aluminum strip which is designed for use in packaging such as cans or can ends. A preferred polyester resin is a high melt viscosity (HMV) resin of the type that has heretofor been used to coat ovenable metal trays, liquid foil packaging and heat sealable foil packaging. Selar ® PT8307 HMV copolymer resin sold by E. I. Du Pont de Nemours company is an example of a high performance polyester resin suitable for use in this invention. Such copolymer can also be blended with other thermoplastic polyesters. For example, a blend of Selar ® PT8307 HMV copolymer with T89 PET sold by Hoescht-Celanese may provide improved performance for aluminum strip coated in accordance with this invention for use in making products such as ends for beverage cans. Other thermoplastic resins suitable for use in this application include polypropylene, polyethylene, polyamides (nylon), polycarbonates and polyvinyl chloride (PVC).

Figure 2:
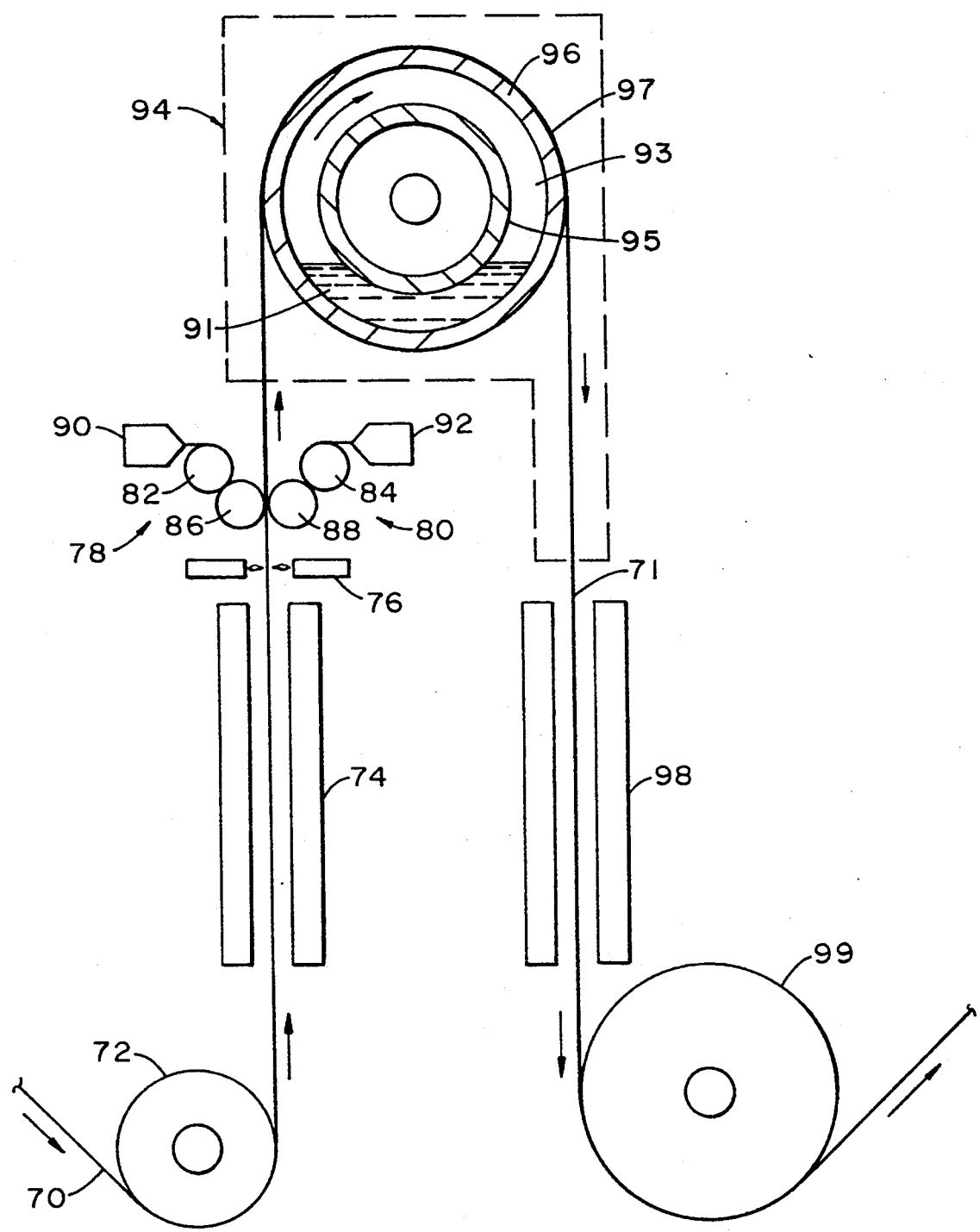
FIG. 2 is a schematic, side elevational view of a portion of another embodiment of this invention.

FIG. 2 shows a portion of an alternative embodiment of a system for practice of the present invention. In this system, the metal strip 70 is coated on both sides as the strip moves vertically upwardly instead of vertically downwardly as in FIG. 1. The metal strip 70 moves around an infeed roll 72 and vertically upwardly from that roll through a pre-heater 74 such as an induction heating system. The strip then moves through a flame treater 76 and between the opposed extrusion systems 78, 80 for coating both sides of the strip. The flame treater enhances the receptivity of the strip to bonding by the resin coating.

The extrusion systems 78, 80 in FIG. 2 are similar to that of FIG. 1 except that the systems 78, 80 each include only two rolls rather than three rolls as in FIG. 1. The surface speed of the pinning and drawing rolls 82, 84 is several times faster than the exit speed of the extruder dies 90, 92 so as to draw and thin the extrudate as in the system of FIG. 1. Rolls 86, 88, which are cooler than rolls 82, 84, receive the extrudate from rolls 82, 84 and apply it to the strip 70.

After the strip 70 has been coated on both sides, the strip continues to move vertically upwardly into an insulated chamber 94 which contains a cooling and a turning roll 96 for cooling the strip and redirecting it vertically downwardly. The chamber 94 is preferably insulated for accurate temperature control of the strip as it moves over the cooling and turning roll 96. The roll 96 preferably has a diameter of at least approximately three feet. The roll's large diameter minimizes stressing of the metal due to curvature effects. The temperature of roll 96 and strip 71 is controlled by fluid 91 in an annular chamber 93 between the roll's outer shell 97 and an inner shell 95. The annular chamber 93 is not filled to capacity so as to minimize the inertia effects (provides viscous damping) and enable speed control and tracking.

The composite coated strip 71 moves vertically downwardly from the turning and cooling roll 96 through a post heater 98 which heats the composite strip to approximately 204°–260° C. (400°–500° F.) to enhance bonding of the polyester resin to the strip as in embodiment of FIG. 1. The heater 98 may be a conventional induction heater, convection oven or infrared heater. The composite strip 71 moves from the heater 98 to a second cooling and turning roll 99 and from that roll to a rewind not shown. Roll 99 is similar in design and dimensions to roll 96 described above.

Figure 3:
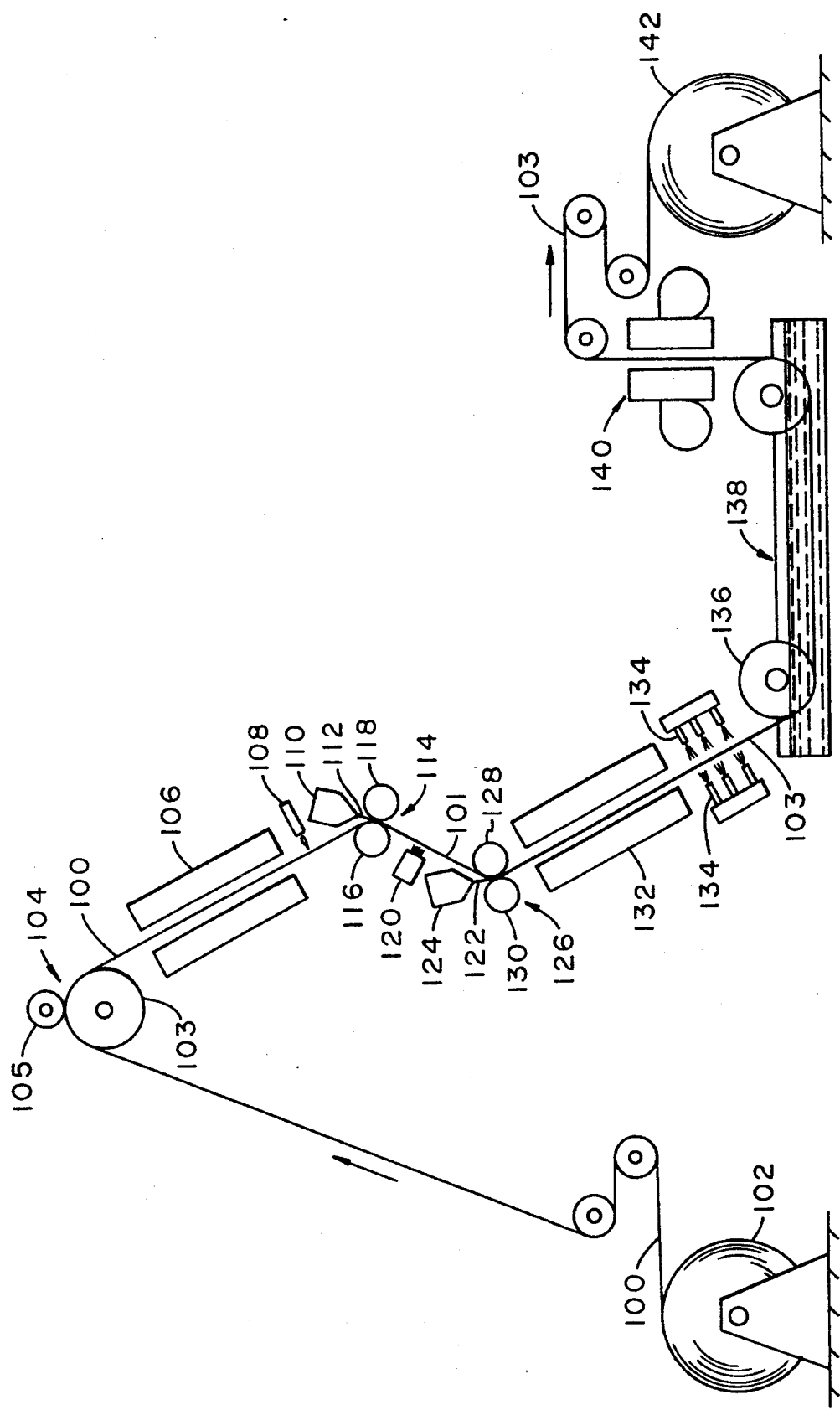
FIGS. 3 and 4 are schematic, side elevational views of further embodiments of this invention.

FIG. 3 is a schematic of another embodiment of this invention in which cleaned, room temperature, conditioned sheet stock 100 is unwound from an unwinder 102 and fed upwards over a draw roll set 104 consisting of roll 103 and back-up roll 105 at the top of the processing stack. Accumulators, not shown, may be included to accommodate coil changes on the unwinder 102.

From the draw roll set 104, the web 100 travels in a vertical and downward direction, and preferably slanted about 30 degrees from the vertical. Such slant facilitates downstream extrusion coating and machinery arrangement. The web 100 passes through a pre-heater 106, wherein an induction field is generated to uniformly heat the metal to a temperature that will enhance downstream "green peel" strength of the bonded polyester to the strip without substantially reducing or otherwise deleteriously affecting the desired metal properties. As used herein, "green peel" strength means that the polyester is adhered to the metal strip with sufficient holding power that the polyester will not delaminate from the strip during subsequent processing. The desired temperature should be in the range of approximately 204°–260° C. (400°–500° F.), and preferably approximately 215°–246° C. (425°–475° F.).

The pre-heated web 100 continues in a downwardly slanted direction and passes through a flame surface treater 108. The flame treater may reduce the surface of the pre-heated metal to eliminate, minimize or enhance oxides, and thereby enhance adhesion of a polymer which is subsequently applied to it.

The heated and treated web 100 next enters the first of two extrusion coating stations. An extruder, not shown, melt-plasticizes a PET polymer or other thermoplastic resin and delivers it through a sheet die 110 which is positioned obliquely from vertical and which has a narrow exit slit. The slit is set to produce a back-pressure to the extruder that enables spreading of an extrudate 112 to a width greater than the width of strip 100. The slit may have a width less than the width of the strip 100 depending on several factors such as the nature and thickness of the polymer resin, the relative speeds of the extruder and metal strip and the shape of the die among other factors. The extrudate 112 is drawn into a roll stack 114 to reduce its thickness to the final thickness for application to the web. The draw thickness ratio should be approximately 10–25:1, depending on the extruded polymer.

The two-roll stack 114 is disposed such that a plane through the centerline of the rolls is slanted approximately 30 degrees from horizontal. The "inside" or turning roll 116 is rubber-coated and has a surface temperature of approximately 205° C. (401° F.) which maintains the pre-heat temperature of the web 100 as it goes through the rolls.

The outside or pressure roll 118 is chrome steel, polished, and maintained at a temperature in a range of approximately 150°–20° C. (302°–392° F.) which below the "stickiness" point of the molten polymer which applies line pressure to the polymer as it is laid down. This enhances adhesion of the polymer to the metal 100 as well as improves surface appearance. The surface speed of the rolls 116, 118 is approximately 10 times faster than the extrudate's exit speed from the extrusion die 110, thus drawing the polymer onto the web 100 to its desired thickness in a range of approximately 0.00762 mm to 0.02032 mm (0.3–0.8 mils) and preferably about 0.01016 mm (0.4 mils). The two-roll stack 114 coats the first side of the web 100 with adequate "green peel" strength to avoid separation of the polymer from the metal during the subsequent processing.

The single-side coated web 101 next exits the stack 114 and turns approximately 60 degrees (as a result of the preferred positioning of the second extrusion station) over the rubber coated roll 116 to slant the web downward 30 degrees from vertical (approximately 60 degrees from the entry position into the first stack). The pre-heated and single-side coated web 101 continues in a 30-degree slanted and downward direction, passes through a second (and possibly larger) flame treater 120, wherein the surface of the pre-heated metal is treated to eliminate/minimize oxides on the second surface and enhance adhesion of the polymer, as well as to provide any needed temperature "boost" to achieve optimum bonding conditions.

The pre-heated and pre-treated web 101 next enters the second of the two extrusion coating stations to coat the opposite side of the web than was coated by the first coating station. The extruder performance requirements, arrangement, and process for the second extruder are identical to the first extruder. The melted extrudate 122 from extrusion die 124 is passed into the nip of a two-roll stack 126 having an arrangement in which a plane through the centerlines of the rolls 128, 130 is inclined approximately 30 degrees from the horizontal (60 degrees from the centerline position of the first stack 114).

The geometries, arrangement, performance, and functions of the rolls 128, 130 are identical to that of the first stack 114. The second side of the pre-heated web 101 is coated with extrudate 122 to produce adequate "green peel" strength, as described above for the first side. The double-side coated web 103 next exits the stack 126 and is preferably turned approximately 60 degrees over the rubber coated roll to achieve a preferred positioning for the second induction bonding heater 132 at approximately 30 degrees from vertical in a downward direction.

The now-coated web 103 continues in a slanted and downward direction and passes through a second heater 132, preferably an induction heater, to uniformly heat the metal to a temperature that will consummate a bond of the plastic to the metal web without substantially reducing or otherwise deleteriously affecting the desired metal properties or the plastic. The temperature is preferably approximately 215° C. (425° F.).

Upon exit from the second induction heater 132, and while continuing in a slanted and downward direction, spray nozzles 134 (or other suitable devices) cool the composite structure to a temperature low enough to allow turning around roller 136 without deleteriously affecting the metal's ultimate end-use performance requirements. The semi-cooled composite 103 is turned and passed through a horizontal water bath 138 to complete the cooling process.

A drying system 140 is used after the composite 103 leaves the bath 138 to remove residual moisture before rewinding. Leveling, which is well known in the art, is performed to remove stresses produced by the turning or bending of the metal strip 100 over the rolls. The completed material 103 is then rewound by rewinder 142. Accumulators, not shown, can be used to accommodate roll changes on the rewinder 142.

Figure 4:
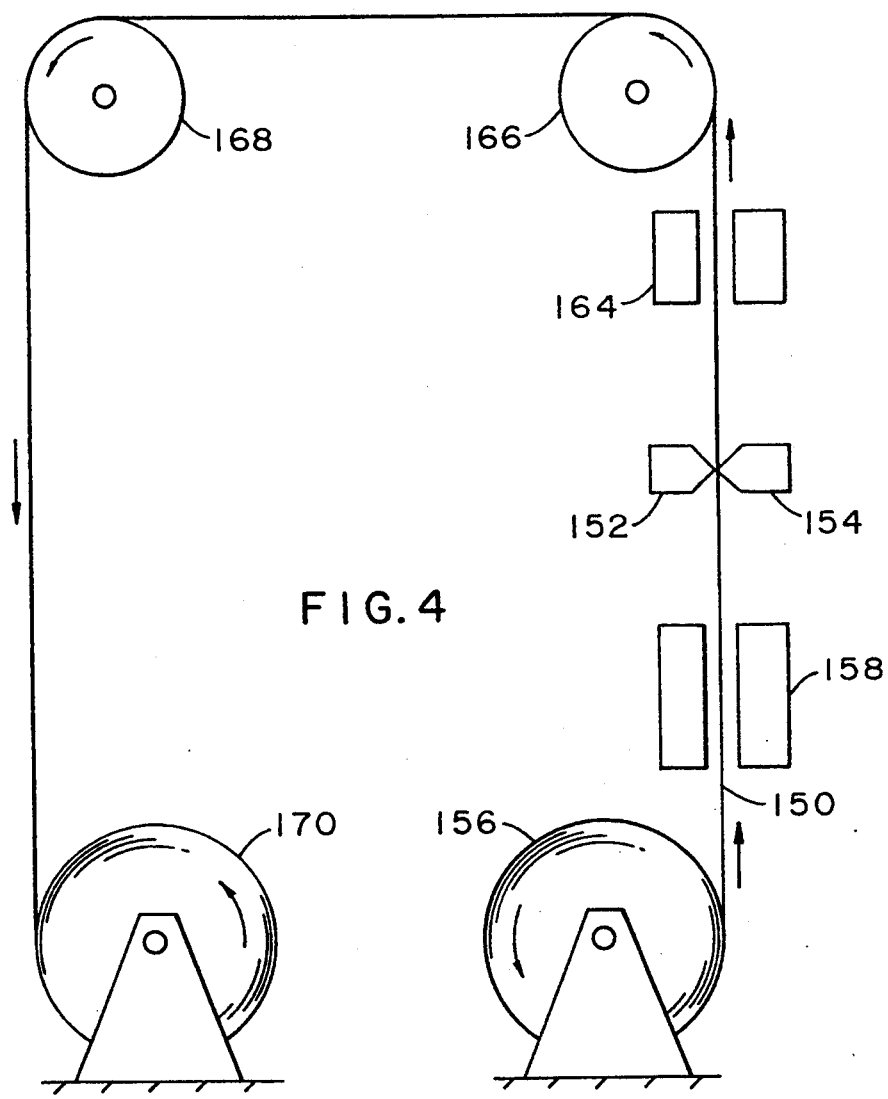
Figure 5:
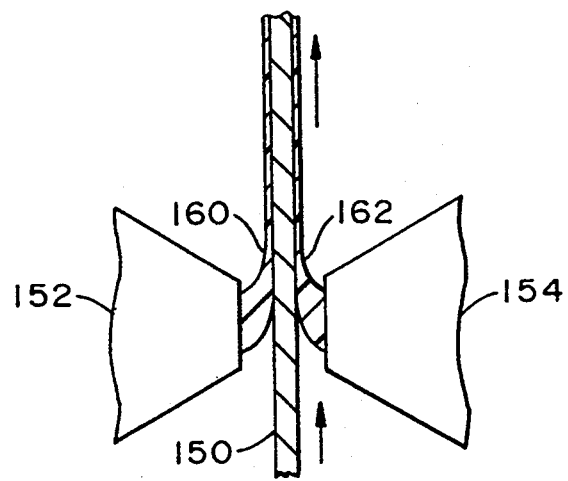
FIG. 5 is a partial cross-section of the strip and extrusion dies of FIG. 4 greatly enlarged to show the application of the resin to the strip.

FIGS. 4 and 5 illustrate a further embodiment of this invention in which the metal strip 150 is moved vertically upwardly during the coating process and in which the extrusion dies 152, 154 apply the molten resin directly against the opposite sides of the strip. The system of FIG. 4 includes an unwinder 156 from which strip 150 travels upwardly through an induction pre-heater 158, and then between two extrusion dies 152, 154. The dies 152, 154 are fed by conventional extruders not shown.

FIG. 5 is a greatly enlarged showing of the dies 152, 154 as they apply extrudate 160, 162 directly to the metal strip 150. The die orifices are positioned close to the strip so that the force of the extrudate issuing from the dies is applied against the strip. The dies are positioned within about 5 to 20 mm of the strip, and preferably less than 10 mm from the strip. The metal strip 150 travels approximately 10–20 times faster than does the extrudate issuing from the dies 152, 154 so the extrudate is drawn and reduced in thickness by pull of the strip on the extrudate. The extrudate may be in the range of 0.0127 to 0.0508 mm (0.0005–0.002 inches) thick on each surface of the strip.

The dies 152, 154 are preferably directly opposed to each other on opposite faces of the strip 150 so the pressure of the extrudate from opposite sides of the strip will center the strip between the dies. The molten polymer impinges upon the surface of the metal strip almost immediately after the extrudate exits the dies, so the polymer does not cool or neck-in before it is applied to the strip. This helps to ensure the application of uniform coatings of the resin on both faces of the strip.

From the extrusion dies 152, 154, the coated strip 151 preferably moves through an induction type post heater 164 which heats the composite strip to above the glass transition temperature (approximately 204°–260° C.) of the polyester resin to enhance bonding of the resin to the strip. The composite strip is then quickly cooled by means not shown and travels over rolls 166 and 168 to a recoiler 170.

Aluminum strip which has been coated in accordance with this invention has many advantages over strip that has been coated or laminated in accordance with prior art methods. One important advantage is that the coating is welded or tightly adhered to both sides of the metal substrate and is much less likely to peel or delaminate when the strip is formed into products such as cans, can ends, or decorative trim for automobiles or appliances. The strip can also be produced at less cost than prior art strip because this invention eliminates secondary processes of forming, rolling and unrolling of films that are laminated to the strip by some prior art techniques.

It is therefore seen that this invention provides an improved process for coating both sides of a metal strip with thermoplastic coatings and to an improved strip which has been so formed. While some alternative modes for practicing the invention have been described, it will be apparent that the appended claims are intended to cover all modes and embodiments which fall within the spirit of the invention. For example, the metal strip could be moved horizontally as it is being coated or the metal strip could be steel or an alloy thereof instead of an aluminum alloy.

What is claimed is:

1. A process for extrusion coating a metal strip to produce a coated metal strip comprising:
   providing a strip of metal about 0.007 to 0.014 inches (0.1778–0.356 mm) thick;
   heating said metal strip to at least about 400° F. (204° C.) but not so high as to deleteriously affect the desired properties of the metal strip;
   extruding high melt viscosity polyester resin substantially simultaneously onto both sides of said heated metal strip to form coatings which are at least partially bonded to said metal strip, said coatings each having a thickness in a range of about 0.0003 inches to 0.0015 inches (0.0076–0.038 mm);
   heating said coated metal strip to at least the glass transition point of said resin but not so high as to deleteriously affect the desired properties of the metal strip such that said resin bonds to said metal strip; and
   cooling said coated metal strip to less than about 104° F. (40° C.) to solidify said resin in a substantially non-crystalline form.

2. A method as set forth in claim 1 in which said strip of metal is a strip of aluminum alloy.

3. A method as set forth in claim 1 in which said rapid cooling of the coated strip is by water spray or water bath.

4. A method of coating both sides of a strip of aluminum alloy sheet with polyester comprising:
   moving an elongated aluminum alloy strip substantially vertically;
   heating the strip;
   extruding molten polyester webs on opposite sides thereof as it moves substantially vertically;
   drawing said webs while substantially maintaining their width to thereby reduce their thickness by at least approximately 80%;
   pressing said webs against opposite sides of said strip to produce a coated strip;
   heating said coated strip; and
   cooling said heated coated strip.

5. A method as set forth in claim 4 in which said extruded webs are polished after they are elongated and before they are pressed against said strip.

6. A method as set forth in claim 4 in which said extruded webs are cooled to a glassy state after they are elongated.

7. A method as set forth in claim 4 in which each of said extruded webs is passed sequentially over at least two rolls which elongate, polish and apply the webs to said strip.

8. A method as set forth in claim 4 in which said elongated webs are less than about 0.04 mm thick.

9. A method as set forth in claim 4 in which said aluminum strip is in the range of 0.1778 to 0.356 mm thick.

10. A method as set forth in claim 4 in which said heated coated strip is cooled by passing it through a curtain of water.

11. A method as set forth in claim 4 in which said coated strip is further cooled by passing it through a water bath.

12. A method as set forth in claim 4 in which said webs comprise a high melt viscosity polyester.

13. A method as set forth in claim 4 in which said coated strip is wound on a coil after it is cooled.

14. A method as set forth in claim 4 in which said elongated strip is flame treated prior to said pressing of the webs against the strip.

15. A coated aluminum alloy strip made by the method of claim 4.

16. A method as set forth in claim 4 in which said strip is moved vertically upwardly while said molten polyester webs are being extruded thereon.

17. A method as set forth in claim 4 in which said heated coated strip is cooled by passing it over a cooling and turning roll.

18. A method as set forth in claim 17 wherein said cooling and turning roll is housed in an insulated chamber.

19. A method as set forth in claim 18, wherein said cooling and turning roll has a diameter of at least approximately six feet.

20. A method as set forth in claim 19, wherein said cooling and turning roll has an inner annular chamber containing a coolant fluid.

21. A method as set forth in claim 4 in which said cooling of the heated coated strip solidifies the polyester thereon in substantially non-crystalline form.

22. A process for extrusion coating an aluminum alloy metal strip to produce a coated aluminum alloy metal strip suitable for use in making containers, the process comprising:
  providing an elongate strip of aluminum alloy metal having a thickness in the range of about 0.1778 to 0.356 mm;
  heating said strip to a temperature in the range of about 121° to 260° C.;
  extruding a high melt viscosity polyester resin onto both sides of said heated strip to form a coating on said strip, said coating having a thickness in the range of about 0.0076 to 0.038 mm;
  heating said coated strip to a temperature in the range of about 200° F. to 260° C.; and
  cooling said coated strip quickly to a temperature of less than about 40° C. to solidify said resin thereon in a substantially non-crystalline form.

23. A method of coating both sides of a strip of aluminum alloy sheet with polyester comprising:
  providing a strip of metal having a first surface and a second surface;
  heating said strip:
  moving said strip generally vertically downward at an angle of about 30° from vertical;
  extruding a first molten polyester web on said first surface of said strip as said strip moves generally vertically downward;
  extruding a second molten polyester web on said second surface of said strip as said strip moves generally vertically downward to produce a coated strip;
  heating said coated strip; and
  cooling said heated coated strip.

24. The method of claim 23, including
  extruding said first molten polyester web by means of a first extrusion die means comprising a first extrusion die which introduces said polyester resin onto said moving strip and a first two-roll stack for drawing said polyester resin from said first extrusion die and reducing said polyester resin to form said first molten polyester web.

25. The method of claim 24, wherein
  said first two-roll stack includes a turning roll which contacts said second surface of said strip and a pressure roll which presses said first molten polyester web onto said first surface of said strip.

26. The method of claim 25, wherein
  said turning roll has a rubber coating.

27. The method of claim 25, wherein
  said pressure roll is composed of chrome steel.

28. The method of claim 25, wherein
  said pressure roll is maintained at a temperature below the stickiness point of said polyester resin.

29. The method of claim 28, wherein
  said stickiness point is about 150° to 200° C.

30. The method of claim 24, including
  said first two-roll stack is oriented such that said strip moves through an angle of about 120° from the point at which it enters said first extrusion die means to the point at which it exits said first extrusion die means.

31. The method of claim 24, including
  extruding said second molten polyester web by means of a second extrusion die means comprising a second extrusion die which introduces said polyester resin onto said moving strip and a second two-roll stack for drawing said polyester resin from said second extrusion die and reducing said polyester resin to form said second polyester web.

32. The method of claim 31, wherein
  said second two-roll stack includes a turning roll which contacts said first surface of said strip and a pressure roll which presses said second molten polyester web onto said second surface of said strip.

33. The method of claim 32, wherein
  said turning roll has a rubber coating.

34. The method of claim 32, wherein
  said pressure roll is composed of chrome steel.

35. The method of claim 32, wherein
  said pressure roll is maintained at a temperature below the stickiness point of said polyester resin.

36. A process for coating a metal strip comprising:
  uncoiling a metal strip from a coil and causing the strip to move longitudinally;
  heating the moving strip to at least about 250° F. (121° C.) but not so high as to substantially deleteriously affect the desired metal properties in the strip;
  extruding heated polymer resin substantially directly onto each side of the heated strip at substantially directly opposed surfaces of the strip so that the pressure of the extrudate substantially centers the strip and forms a coated strip;
  heating said coated strip to at least about 425° F. (215° C.) but not so high as to substantially deleteriously affect the desired metal properties; and
  promptly cooling the heated, coated strip to solidify said resin in a substantially non-crystalline form.

37. A process as set forth in claim 36 in which said metal strip is a thin gauge aluminum alloy strip suitable for use in making cans.

38. A process as set forth in claim 37 in which said polymer on at least one side of said strip is high melt viscosity polyester resin.

* * * * *